US012559006B2

(12) United States Patent
Zürcher et al.

(10) Patent No.: US 12,559,006 B2
(45) Date of Patent: *Feb. 24, 2026

(54) PASSENGER RESTRAINT SYSTEM FOR ROLLER COASTERS

(71) Applicant: Bolliger & Mabillard Ingénieurs Conseils S.A., Monthey (CH)

(72) Inventors: Alain Zürcher, Pampigny (CH); Éric Berra, Monthey (CH)

(73) Assignee: Bolliger & Mabillard Ingénieurs Conseils S.A., Monthey (CH)

( * ) Notice: Subject to any disclaimer, the term of this patent is extended or adjusted under 35 U.S.C. 154(b) by 642 days.

This patent is subject to a terminal disclaimer.

(21) Appl. No.: 17/925,781

(22) PCT Filed: Jul. 2, 2021

(86) PCT No.: PCT/IB2021/055956
§ 371 (c)(1),
(2) Date: Nov. 16, 2022

(87) PCT Pub. No.: WO2022/003642
PCT Pub. Date: Jan. 6, 2022

(65) Prior Publication Data
US 2023/0182627 A1 Jun. 15, 2023

(30) Foreign Application Priority Data
Jul. 2, 2020 (EP) .................................... 20183821

(51) Int. Cl.
B60N 2/42 (2006.01)
A63G 7/00 (2006.01)
(Continued)

(52) U.S. Cl.
CPC ............. B60N 2/4242 (2013.01); A63G 7/00 (2013.01); B60N 2/24 (2013.01); B60N 2/52 (2013.01); B60R 2021/0097 (2013.01)

(58) Field of Classification Search
CPC ........ B60N 2/24; B60N 2/4242; B60N 2/505; B60R 2021/0097; B60R 2021/022
See application file for complete search history.

(56) References Cited

U.S. PATENT DOCUMENTS 1,042,066 A 10/1912 Zsinko
1,767,627 A 6/1930 Traver
(Continued)

FOREIGN PATENT DOCUMENTS

CN 203379586 U 1/2014
CN 205948360 U 2/2017
(Continued)

OTHER PUBLICATIONS

International Search Report; European Patent Office; International Application No. PCT/IB2021/055956; Oct. 15, 2021; 6 pages.
(Continued)

*Primary Examiner* — Alexander K Garlen
(74) *Attorney, Agent, or Firm* — Taft Stettinius & Hollister LLP

(57) ABSTRACT

A passenger restraint system for roller coasters designed to maintain a passenger in an essentially seated or lying posture, with suspended feet. The passenger restraint system includes a fixed column and a seat column designed to support and hold the passenger, which seat column is coupled to the fixed column so as to be displaceable with respect to the fixed column during a roller coaster ride. The seat column is coupled to the fixed column by an articulated linkage, and the passenger restraint system further includes a balancing device ensuring a balancing of the seat column, which balancing device is fixed, at a first end, to the fixed column and, at a second end, to the seat column. The balancing device can advantageously be configured to ensure a vertical travel of the seat column during the roller (Continued)

coaster ride in dependence of a vertical acceleration exerted on the passenger.

30 Claims, 2 Drawing Sheets

(51) Int. Cl.

| | |
|---|---|
| *B60N 2/24* | (2006.01) |
| *B60N 2/52* | (2006.01) |
| *B60R 21/00* | (2006.01) |

(56) References Cited

U.S. PATENT DOCUMENTS

| | | | | |
|---|---|---|---|---|
| 3,474,623 | A | 10/1969 | Barrett et al. | |
| 3,493,211 | A * | 2/1970 | Barecki | B60N 2/505 |
| | | | | 248/608 |
| 3,599,232 | A * | 8/1971 | Tabor | B60N 2/544 |
| | | | | 248/575 |
| 3,668,870 | A * | 6/1972 | Hall | B60N 2/505 |
| | | | | 60/407 |
| 3,685,780 | A * | 8/1972 | Stannebein | B60N 2/507 |
| | | | | 248/575 |
| 3,917,209 | A * | 11/1975 | Adams | B60N 2/544 |
| | | | | 248/575 |
| 3,951,373 | A * | 4/1976 | Swenson | B60N 2/507 |
| | | | | 248/585 |
| 4,351,556 | A * | 9/1982 | Worringer | B60N 2/507 |
| | | | | 248/424 |
| 5,004,206 | A * | 4/1991 | Anderson | B60N 2/507 |
| | | | | 267/225 |
| 5,272,984 | A | 12/1993 | Bolliger et al. | |
| 6,241,209 | B1 | 6/2001 | von Mayenburg et al. | |
| 6,287,211 | B1 | 9/2001 | Bolliger et al. | |
| 6,340,152 | B1 * | 1/2002 | Ritchie | B60N 2/525 |
| | | | | 188/300 |
| 6,352,034 | B1 * | 3/2002 | Bolliger | A63G 7/00 |
| | | | | 104/53 |
| 6,487,975 | B1 | 12/2002 | Gordon | |
| 7,070,153 | B1 | 7/2006 | Stenard | |
| 10,532,673 | B2 * | 1/2020 | Kemp | B60N 2/527 |
| 11,135,988 | B2 * | 10/2021 | Zürcher | B60N 2/427 |
| 2002/0070599 | A1 | 6/2002 | Berra | |
| 2007/0029854 | A1 | 2/2007 | Robinson | |
| 2007/0034768 | A1 * | 2/2007 | Stenard | B60N 2/42736 |
| | | | | 248/562 |

| | | | |
|---|---|---|---|
| 2010/0236444 | A1 | 9/2010 | Blonk et al. |
| 2010/0326312 | A1 | 12/2010 | Jacobi et al. |
| 2011/0062755 | A1 | 3/2011 | Gil et al. |
| 2020/0298783 | A1 | 9/2020 | Zurcher |

FOREIGN PATENT DOCUMENTS

| | | | |
|---|---|---|---|
| CN | 206700786 | U | 12/2017 |
| CN | 207913203 | U | 9/2018 |
| DE | 202007001485 | U1 | 5/2007 |
| EP | 0545860 | A1 | 6/1993 |
| EP | 1020213 | A1 | 3/2004 |
| EP | 1020212 | A1 | 6/2004 |
| EP | 1607122 | A2 | 12/2005 |
| EP | 1215091 | A2 | 2/2006 |
| EP | 1201280 | A2 | 4/2008 |
| EP | 3003789 | B1 | 8/2018 |
| EP | 3711832 | A1 | 9/2020 |
| EP | 3718615 | A1 | 12/2021 |
| FR | 2084495 | A5 | 12/1971 |
| FR | 2442381 | A1 | 6/1980 |
| GB | 2041490 | A | 9/1980 |
| GB | 2348376 | A | 10/2000 |
| JP | H112445 | A | 1/1999 |
| JP | 2002166058 | A | 6/2002 |
| JP | 3205443 | U | 7/2016 |
| WO | 2007136245 | A1 | 11/2007 |

OTHER PUBLICATIONS

Written Opinion of the International Searching Authority; European Patent Office; International Application No. PCT/IB2021/055956; Oct. 15, 2021; 7 pages.

The Wrecking Ball from Tim's 2000 Roller Coaster Portfolio; Vimeo video available at https://vimeo.com/375164731; published on Nov. 23, 2019; 1 page.

Camloc Motion Control; Understanding the Basics: Guide to Gas Spring Application; published in 2018; 8 pages; Copyright 2018 Camloc Motion Control Ltd.

XCRAFT Suspension System; published on Nov. 13, 2016 from Way Back Machine; https://web.archive.org/web/20161113184301/http://www.xcraftseats.com/x-system/; 1 page.

Gravity Kraft Timberliner, Trains for the Modern Wooden Roller Coaster; disclosed at least from 2010; 2 pages.

Opposition a un brevet europeen; European Patent Office; European Patent No. EP4175728; Jun. 5, 2024; 1 page.

Notice of Opposition; European Patent Office; European Patent No. EP4175728B1; Mar. 5, 2025; 1 page.

* cited by examiner

PASSENGER RESTRAINT SYSTEM FOR ROLLER COASTERS

CROSS REFERENCE TO RELATED APPLICATIONS

This application is a U.S. national stage filing of International Patent Application No. PCT/IB2021/055956 filed Jul. 2, 2021, which claims priority to European Patent Application No. 20183821.6 filed Jul. 2, 2020, the contents of each application hereby incorporated by reference in its entirety.

TECHNICAL FIELD

The present invention generally relates to a passenger restraint system for roller coasters, and more specifically such a passenger restraint system that is designed to maintain a passenger in an essentially seated or lying posture during a roller coaster ride.

TECHNOLOGICAL BACKGROUND

Such passenger restraint systems are known in the state of the art, especially from the publications of European patent applications Nos. EP 0 545 860 A1, EP 1 020 212 A1, EP 1 020 213 A1, EP 1 201 280 A2, and EP 1 215 091 A2, all in the name of the present Applicant.

European patent application No. EP 0 545 860 A1 discloses a so-called "inverted" roller coaster installation (or "inverted coasters") wherein each passenger restraint system is designed to maintain a passenger in an essentially seated posture during the roller coaster ride, suspended under rails supporting the vehicle bearing the passenger restraint system, with legs dangling in the open air, without a wall or floor around the passenger.

European patent application No. EP 1 020 212 A1 discloses a passenger restraint system designed to maintain a passenger in an essentially seated posture within a seat during the roller coaster ride, with the passenger's feet resting on a floor of the vehicle bearing the passenger restraint system. The passenger restraint system comprises a swivelling bar topped by a holding element intended to restrain the passenger in the seat, which holding element has a particular form intended to come into contact with the passenger's thighs. This type of passenger restraint system is especially used in high-speed roller coaster installations without inversion (or "hyper coasters").

European patent application No. EP 1 020 213 A1 discloses a floorless roller coaster installation (or "floorless coasters") wherein each passenger restraint system is designed to maintain a passenger in an essentially seated posture during the roller coaster ride, above rails supporting the vehicle bearing the passenger restraint system, with legs dangling in the open air, without a floor under the passenger's feet.

European patent application No. EP 1 201 280 A2 discloses a so-called "flying" roller coaster installation (or "flying coasters") wherein each passenger restraint system is designed to maintain a passenger in an essentially lying posture during the roller coaster ride, suspended under rails supporting the vehicle bearing the passenger restraint system, with the back of the passenger disposed substantially parallel to the track formed by the rails. In this case, the passenger restraint system also comprises a leg holding device. A variant of such a holding device for holding the passenger's legs is also disclosed in European patent application No. EP 1 215 091 A2.

Independently of the essentially seated or lying posture of the passenger, the passenger restraint systems disclosed in the abovementioned publications are all arranged so as to be fixedly secured to the vehicle carrying the passengers, without the possibility of a relative movement with respect to said vehicle during the roller coaster ride. The movement to which the passengers are subjected is thus directly induced and determined by the particular layout of the track followed by the vehicle carrying the passengers, each passenger feeling sensations resulting from the changes of direction and acceleration defined by this layout.

International application No. WO 2007/136245 A1 discloses a passenger restraint system for roller coasters designed to maintain the passenger in a plurality of postures, with the passenger's feet resting on a support platform. This passenger restraint system is more particularly designed to allow a passenger to occupy a plurality of postures and make movements between these postures, namely, an essentially vertical (standing) posture, a squatting posture, and a bowed/forward-inclined posture. FIG. 5 of International application No. WO 2007/136245 A1 more specifically shows such a passenger restraint system allowing especially the passenger to incline or bow forward. This restraint system especially comprises a backrest intended to be coupled to the torso of the passenger and connection means (of which only a part is illustrated) intended to couple the backrest to the platform of the vehicle supporting the passenger. It is mentioned that the connection means can also comprise a column (not represented) disposed on the platform, but it is not specified how this column is supposed to be coupled to the illustrated connection means. In any event, reference is at most made to a double wishbone construction comprising two superposed plates linked by a pair of transverse bars, a pair of dampers placed in diagonal position, and a damper placed in horizontal position, which are coupled to one another via pivoting axes. The geometry of this construction aims essentially to allow the backrest, and therefore the passenger, to perform a forward rotational movement of the order of 15° to 20°. No particular balancing device is however described, the abovementioned dampers ensuring no balancing function, but simply a damping of the rotational movement of the backrest.

U.S. patent No. U.S. Pat. No. 7,070,153 B1 essentially discloses a seat supported via its base on top of a platform by means of an articulated linkage comprising articulated arms and a suspension device comprising a pair of gas actuators/supports disposed diagonally and arranged to subject the seat to an upward force whose amplitude is adjustable. This seat is primarily intended to equip a vehicle. One possible application of this seat to a thrill ride is described, it being noted that reference is only made to an amusement ride of free-fall type wherein passengers are subjected to a vertical free fall of several hundred feet ending in a sudden stop at the end of the fall. No reference is made to any possible application of this solution to a passenger restraint system for roller coasters.

French patent application No. FR 2 442 381 A1 and French patent FR 2 084 495 A5, for their part, simply disclose suspension and damping devices for vehicle seats, especially all-terrain vehicles.

There remains a need to propose a passenger restraint system for maintaining a passenger in an essentially seated or lying posture which offers greater sensations to the passenger, while ensuring increased comfort.

SUMMARY OF THE INVENTION

A general aim of the present invention is therefore to propose a system for maintaining a passenger in an essentially seated or lying posture which remedies the drawbacks of the known solutions.

More particularly, an aim of the present invention is to propose such a solution which guarantees both an adequate restraint of the passenger while ensuring greater sensations and a better comfort for the passenger during the roller coaster ride.

Moreover, an aim of the present invention is to propose such a solution which is robust and reasonably simple to implement.

Another aim of the present invention is to propose such a solution which is reliable and for which maintenance is facilitated.

Considering the abovementioned aims, there is proposed, according to a first aspect of the present invention, a passenger restraint system for roller coasters, the features of which are recited in claim 1, namely, such a passenger restraint system designed to maintain a passenger in an essentially seated or lying posture, with suspended feet, the passenger restraint system being especially characterized in that it comprises a fixed column and a seat column designed to support and hold the passenger, which seat column is coupled to the fixed column in such a way as to be displacable with respect to the fixed column during a roller coaster ride. The passenger restraint system further comprises a balancing device ensuring a balancing of the seat column, which balancing device is fixed, at a first end, to the fixed column and, at a second end, to the seat column.

The seat column can in particular be coupled to the fixed column by means of an articulated linkage, and the first and second ends of the balancing device fixed respectively to the fixed column and to the seat column are articulated. In this context, and contrary to the known solutions, it will therefore be noted that the passenger is held in a seated or lying position via a movable seat column, namely, via an articulated linkage between the seat column and a fixed column, the seat column being balanced by the balancing device in order to maintain the seat column at a distance from the fixed column. This offers the possibility of a relative movement of the passenger with respect to the vehicle bearing the passenger restraint system. The articulated linkage also ensures greater smoothness and softness of displacement. This articulated linkage is moreover particularly simple and compact, while remaining robust.

According to a particularly preferred embodiment, the articulated linkage comprises a set of levers articulated on the fixed column and on the seat column and forming a parallelogram linkage between the fixed column and the seat column. This ensures optimal guiding of the seat column on the fixed column, also guaranteeing that the orientation of the seat column with respect to a vertical direction remains unchanged, independently of the height-wise position of the seat column. It will however be understood that the invention is not specifically limited to the use of a set of articulated levers, as described and illustrated, other articulated linkage configurations being perfectly possible.

Preferably, the balancing device extends through an interstitial space of the articulated linkage, which results in a particularly compact arrangement.

Particularly advantageously, according to another aspect of the invention, the balancing device can be configured to ensure a vertical travel of the seat column during the roller coaster ride in dependence of a vertical acceleration exerted on the passenger. This other aspect is moreover applicable independently of the manner with which the seat column is coupled to the fixed column.

In this context, the balancing device can also be equipped with a system making it possible to adjust and control a speed of the vertical travel of the seat column.

The balancing device can be a spring device, such as a gas spring, or preferably, a hydraulic or hydropneumatic device, in particular a hydraulic or hydropneumatic cylinder. In the latter case, the balancing device can then be equipped with a hydraulic fluid flow rate regulator making it possible to adjust and control the speed of the vertical travel of the seat column. It will however be understood that the invention is not specifically limited to the use of a spring device or of a hydraulic or hydropneumatic device as balancing device, other types of balancing devices being perfectly possible.

With respect to the use of a hydraulic or hydropneumatic device for the balancing of the seat column, the passenger restraint system further preferably comprises an accumulator coupled to the balancing device, which accumulator is capable of generating a hydraulic pressure necessary to the balancing of a weight of the seat column. This accumulator can in particular be a hydropneumatic accumulator.

Still in the context of the use of a hydraulic or hydropneumatic device for the balancing of the seat column, an internal pressure of the hydraulic or hydropneumatic device is preferably adjustable. That makes it possible in particular to modify and vary the sensitivity of the system to the accelerations throughout the roller coaster ride. The intensity of the effect generated can consequently vary depending on the selected internal pressure.

According to a preferred variant, the passenger restraint system is configured such that the seat column occupies, in the presence of the passenger and in the absence of any vertical acceleration other than that due to gravity, a lower position with respect to the fixed column. In the absence of the passenger, the seat column can indifferently be balanced by means of the balancing device such that the seat column occupies an upper or lower position.

This preferred variant moreover constitutes a second aspect of the invention which can be implemented independently of the other aspects of the invention. In that respect, there is proposed, according to a second aspect of the present invention, a passenger restraint system for roller coasters, the features of which are recited in the independent claim 14, namely, such a passenger restraint system designed to maintain a passenger in an essentially seated or lying posture, the passenger restraint system being especially characterized in that it comprises a fixed column and a seat column designed to support and hold the passenger, which seat column is coupled to the fixed column so as to be displacable with respect to the fixed column during a roller coaster ride. The passenger restraint system further comprises a balancing device ensuring a balancing of the seat column, which balancing device is fixed, at a first end, to the fixed column and, at a second end, to the seat column. Furthermore, the balancing device is configured to ensure a vertical travel of the seat column during the roller coaster ride in dependence of a vertical acceleration exerted on the passenger. Finally, the passenger restraint system is configured such that the seat column occupies, in the presence of the passenger and in the absence of any vertical acceleration other than that due to gravity, a lower position with respect to the fixed column.

In the latter context, it will therefore be understood that the seat column and the passenger will tend to rise from the lower position when a certain vertical acceleration threshold is reached. More specifically, when the vertical acceleration becomes lower than a certain threshold determined by the equilibrium of the various forces being exerted on the seat column and the passenger, for example when going over a bump, the seat column and the passenger held by the latter will tend to undergo an ascending phase and to leave the lower position to rise vertically toward an upper position, possibly reaching the limit of travel of the seat column. When the vertical acceleration once again increases to exceed said threshold, the resultant of the forces applied will tend to return the assembly composed of the seat column and of the passenger to the lower position.

Preferably, the passenger restraint system is configured such that the assembly formed of the seat column and the passenger can rise from the lower position when said assembly is subjected to a vertical acceleration such that the resulting force due to the vertical acceleration exerted on the seat column and the passenger becomes lower than a pushing force exerted by the balancing device.

Even more preferably, the passenger restraint system is configured such that the seat column and the passenger can successively undergo (especially when passing over a bump provided on the track of the roller coaster) an ascending phase during which the seat column and the passenger rise from the lower position, followed by a descending phase during which the seat column and the passenger are returned to the lower position.

Finally, the balancing device can further be equipped with a damping device, thus limiting oscillations as well as risks of impact when the system arrives in abutment.

Preferably, the passenger restraint system comprises a holding device secured to the seat column. This holding device can in particular comprise:

a backrest fixed to the seat column, against which the passenger can bear, with a back placed against the backrest;

a seat borne by a support of the seat column; and a front safety bar mounted pivotably on an upper part of the seat column and designed to be lowered onto and around a torso of the passenger.

The abovementioned backrest and seat can advantageously each comprise a pair of lateral holding elements configured to enclose the passenger at the back, arms, hips and thighs.

The front safety bar can in particular comprise a holding element configured to bear against an abdomen and an upper part of thighs of the passenger when the front safety bar is lowered.

Also claimed is a roller coaster comprising at least one passenger restraint system according to the invention.

Other aspects of the invention will be disclosed in the remainder of the present description.

BRIEF DESCRIPTION OF THE DRAWINGS

The features and advantages of the present invention will become more clearly apparent from the following detailed description of various embodiments of the invention, which are presented solely by way of non-limiting examples and are illustrated by the appended drawings, in which.

EMBODIMENTS OF THE INVENTION

The present invention will be described with reference to various preferred embodiments as illustrated particularly in the appended figures.

Figure 1:
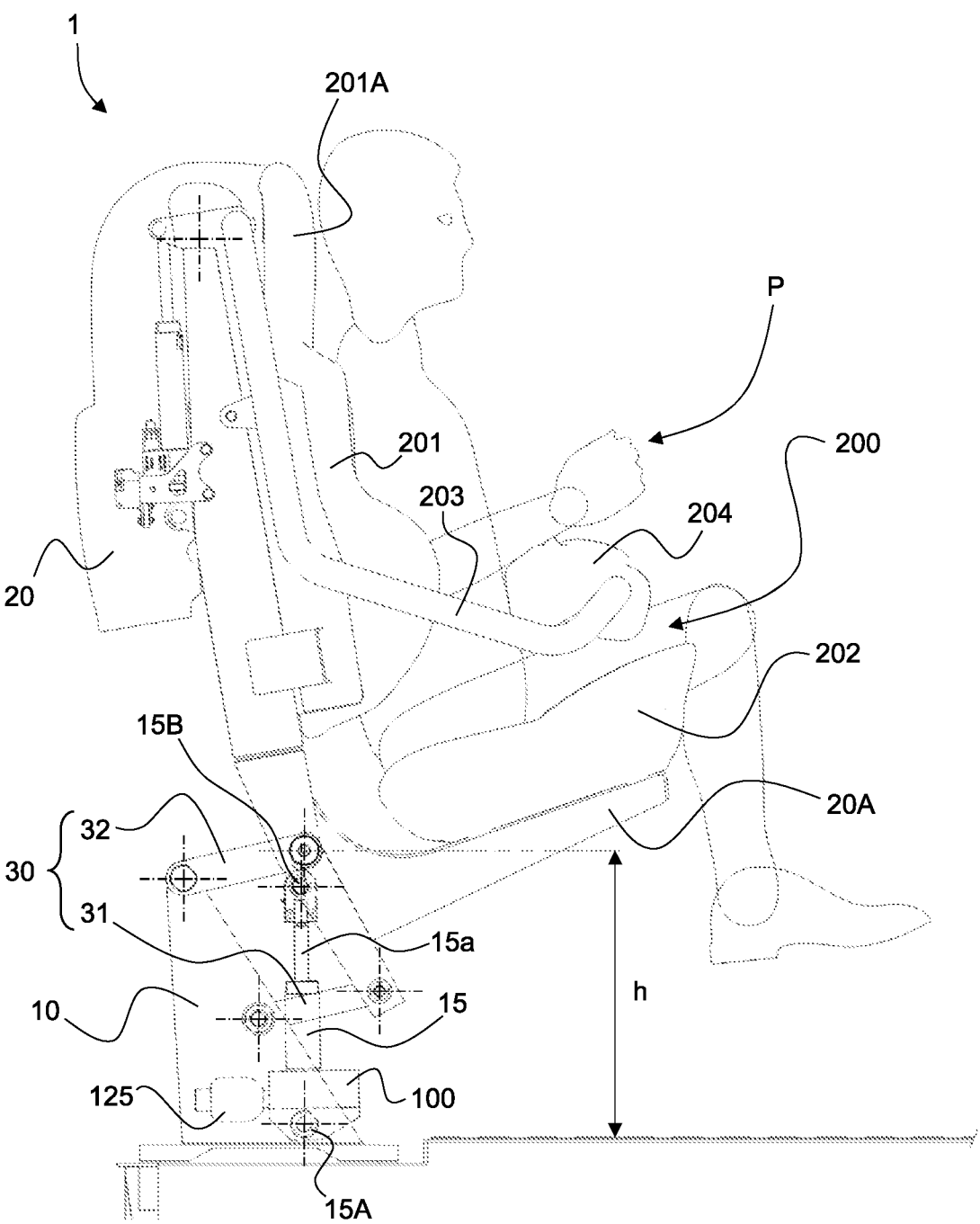
FIG. 1 is a side view of a passenger restraint system according to an embodiment of the invention.

FIG. 1 shows a side view of a passenger restraint system for roller coasters, which system is generally designated by reference numeral 1, according to an embodiment of the invention. This passenger restraint system 1 is designed to maintain a passenger, also illustrated, schematically, in FIG. 1 and designated by reference P, which passenger P is here supported and held in an essentially seated posture by the passenger restraint system 1.

The passenger restraint system 1 comprises a fixed column 10 which is fixed by its base to a support platform or can alternatively form an integral part of this support platform. This platform typically forms part of a vehicle (not represented) designed to run on the roller coaster, typically along rails. The passenger P is supported and held by a seat column 20, at a distance from the support platform, with feet suspended above said support platform, which seat column 20 is coupled to the fixed column 10 in such a way as to be displacable with respect to the fixed column 10 as will be detailed later. In this respect, the height h indicated in FIG. 1 should be understood to be variable.

The seat column 20 is provided with a holding device 200 configured to accommodate the passenger P in a seated position, which holding device 200 can take various forms. According to the embodiment shown as an illustrative example in FIG. 1, the holding device 200 essentially comprises a backrest 201 fixed to the seat column 20, against which the passenger P can bear, with the back placed against the backrest 201, which backrest 201 is moreover provided with a headrest 201A and a pair of lateral holding elements configured to enclose the passenger P at the back and arms. The holding device 200 also comprises a seat 202 borne by a support 20A of the seat column 20, which seat 202 is also provided with a pair of lateral holding elements enclosing the passenger at the hips and thighs, in the manner of a bucket seat. The holding device 200 also comprises a front safety bar 203, mounted pivotably on an upper part of the seat column 20, and designed to be lowered onto and around the torso of the passenger P. This front safety bar 203 here comprises, on its distal end, a holding element 204 which comes to bear against the abdomen and the upper part of the thighs of the passenger P when the front safety bar 203 is lowered. This safety bar is typically locked into position, once positioned on the thighs of the passenger, by a suitable locking device.

It will be understood that the invention is not specifically limited to a passenger restraint system comprising a holding device 200 as specifically illustrated, other holding device configurations being perfectly possible.

In the illustrated example, the seat column 20 is coupled to the fixed column 10 by means of an articulated linkage designated by reference numeral 30 and the passenger restraint system 1 further comprises a balancing device ensuring a balancing of the seat column 20, which balancing device exerts a vertical pushing force in a direction opposite to the weight exerted by the seat column 20 and designed to partially or totally compensate the weight exerted by the seat column 20. This balancing device here preferably comprises a hydraulic (or hydropneumatic) cylinder 15 fixed, at a first articulated end 15A, to the fixed column 10 and, at a second articulated end 15B, to the seat column 20. In the illustrated preferred embodiment, reference 15a designates a piston of the hydraulic cylinder 15, secured, at the articulated end 15B, to the seat column 20.

The articulated linkage 30 can take various forms. Preferably, as illustrated, this articulated linkage 30 comprises a set of levers, respectively lower levers 31 and upper levers 32, advantageously forming a parallelogram linkage between the fixed column 10 and the seat column 20. More specifically, the articulated linkage 30 here comprises a pair of lower levers 31 articulated at each end on the fixed column 10, on the one hand, and on the seat column 20, on the other hand. Likewise, the articulated linkage 30 comprises a pair of upper levers 32, the effective length of which is identical to the effective length of the lower levers 31, which upper levers 32 are likewise articulated at each end on the fixed column 10, on the one hand, and on the seat column 20, on the other hand.

The very compact configuration of the articulated linkage 30 is immediately noticeable. The geometry of the articulated linkage 30 is preferably chosen in such a way that the seat column 20 can be moved along an essentially vertical trajectory, it being noted, however, that the parallelogram linkage causes a relative movement between the fixed column 10 and the seat column 20 along a circular arc trajectory, the amplitude of movement being determined by the effective working amplitude of the balancing device 15. In that respect, FIG. 1 shows the restraint system 1 in a configuration where the seat column 20 is placed in an upper position, the hydraulic cylinder 15 being illustrated in a position in which the piston 15*a* is almost entirely deployed.

The ends 15A, 15B of the balancing device 15 are, here, articulated, in that the balancing device 15 undergoes a slight rotational movement about an axis coinciding with the bottom end 15A of the balancing device 15 depending on the positioning of the seat column 20 with respect to the fixed column 10, causing a corresponding relative movement of the balancing device 15 with respect to the fixed column 10 and to the seat column 20. More specifically, in the example illustrated in FIG. 1, the lower part of the balancing device 15 is secured to a support element 100 which is articulated on the fixed column 10 at the articulated end 15A. This support element 100 is likewise articulated in that it follows the movement of the balancing device 15 and therefore undergoes a corresponding relative movement with respect to the fixed column 10. This support element 100 is mounted, with the associated balancing device 15, inside a recess formed within the fixed column 10.

Advantageously, the balancing device 15 extends through an interstitial space of the articulated linkage 30, here through the space formed between the lower levers 31.

The use of an articulated linkage between the fixed column 10 and the seat column 20, such as the articulated linkage 30 illustrated in FIG. 1, offers an easy movement as well as a greater smoothness and softness of displacement. This articulated linkage is moreover simple and compact, while remaining robust.

Instead of the hydraulic (or hydropneumatic) cylinder 15 illustrated, it is possible to envisage, if necessary, the use of a spring device, such as a gas spring, as balancing device, or any other suitable balancing device.

Figure 2:
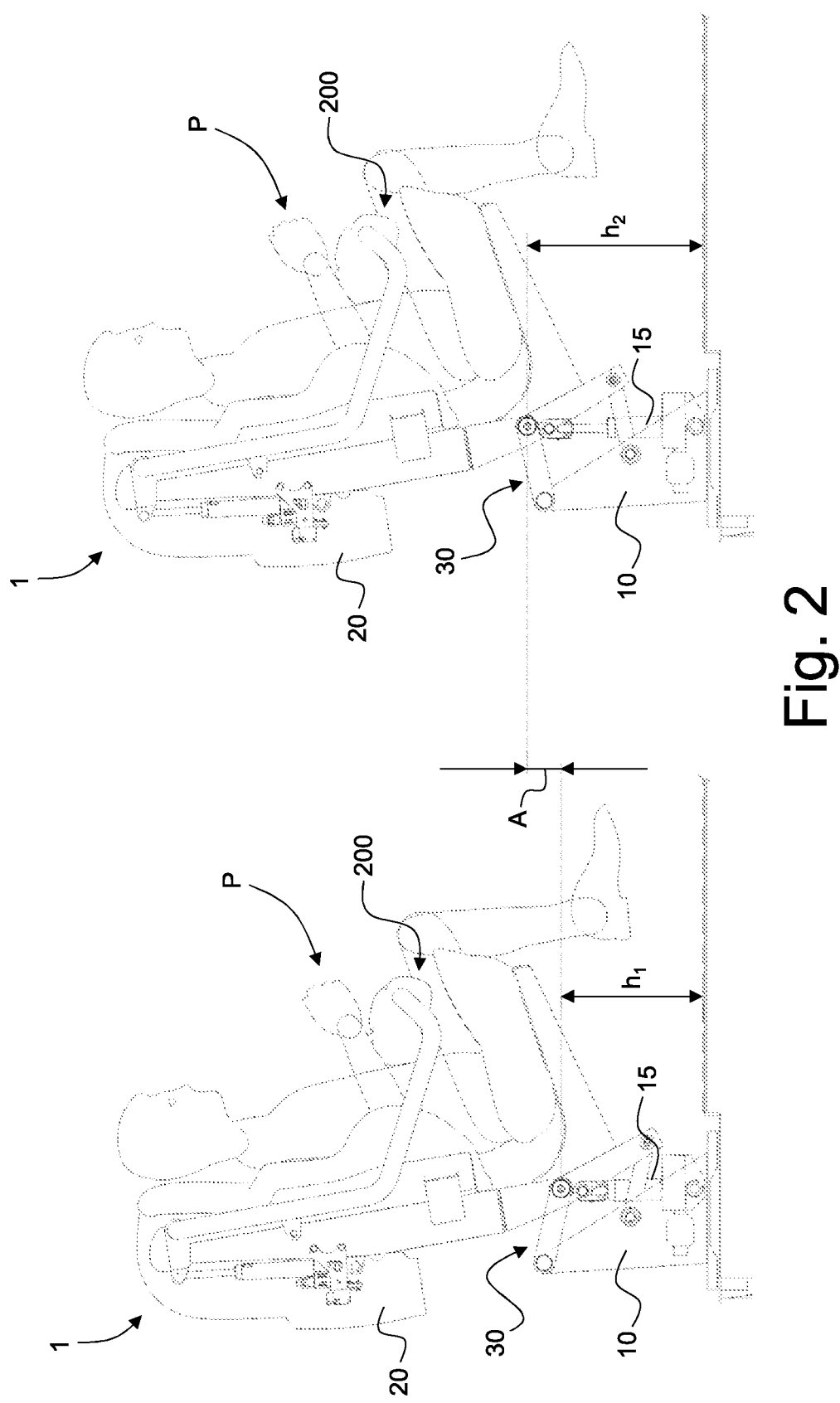
FIG. 2 is a side view of the passenger restraint system of FIG. 1 illustrating a vertical travel of said restraint system during the roller coaster ride.

Even more advantageously, according to another aspect of the invention which is applicable independently of the abovementioned articulated linkage, the balancing device 15 is configured to ensure a vertical travel of the seat column 20 during a roller coaster ride, and this in dependence of the vertical acceleration being exerted on the passenger P. This vertical travel aims at allowing the passenger P to undergo a vertical movement in dependence of the track followed by the vehicle bearing the passenger P, according to an ascending phase and a descending phase, movement whose amplitude can be variable. FIG. 2 shows the passenger restraint system 1 in lower position (on the left), the seat column 20 being disposed at a first height $h_1$ with respect to the floor, and in an upper position (on the right), the seat column 20 being disposed at a second height $h_2$ with respect to the floor. The maximum amplitude of the vertical movement of the seat column 20 and of the passenger P borne by the latter is highlighted in FIG. 2 and designated by reference A.

According to the embodiment being discussed, the upper position preferably corresponds to the position occupied by the seat column 20 in the absence of the passenger P. In other words, the passenger restraint system 1 is, here, configured such that the seat column 20 is balanced in order to occupy an upper position with respect to the fixed column 10 in the absence of the passenger P. Before the start of the passenger embarkation phase, each passenger restraint system 1 is thus by default balanced in the upper position, that is to say that the balancing device 15 assumes a deployed position bringing the seat column 20 to the upper position. During the embarkation phase, when the passenger P sits on the seat, the added weight of the passenger P creates a shift in the equilibrium of the forces of the assembly, which has the effect of bringing the seat column 20 into the lower position with respect to the fixed column 10.

It is however alternatively possible to configure the passenger restraint system 1 such that the seat column 20 is balanced in order to occupy a lower position with respect to the fixed column 10 even in the absence of the passenger P. In such case, it will therefore be understood that the seat column 20 will already by default occupy a lower position during the embarkation phase and that the pushing force exerted by the balancing device 15 will be comparatively lower than in the case mentioned previously.

In both cases, it will be understood that the assembly composed of the seat column 20 and of the passenger P held by the latter will by default occupy the lower position in the absence of any vertical acceleration other than that due to gravity (it being understood that reference is made here to the vertical acceleration due to the Earth's gravity, equivalent to 9.81 m/s$^2$) and that this applies as long as the vertical acceleration does not drop below a certain threshold determined by the equilibrium of the forces applied, namely, in particular the force due to the vertical acceleration being exerted on the seat column 20 and the passenger P (including the force due to gravity and the vertical acceleration caused by the ride on the roller coaster) and the pushing force exerted by the balancing device 15.

When the vehicle carrying the passengers P leaves the embarkation zone, and as long as the vertical acceleration remains high and such that the resulting force being exerted on the seat column 20 and the passenger P is greater than the pushing force of the balancing device 15, the system maintains itself in the lower position.

Preferably, the passenger restraint system 1 is, here, configured so as to rise from the lower position when the assembly composed of the seat column 20 and of the passenger P is subjected to a vertical acceleration such that the resulting force being exerted on the assembly becomes lower than the pushing force exerted by the balancing device 15, which occurs for example when passing over a bump. The seat column 20 and the passenger P held by the latter will thus tend to leave the lower position and rise vertically (ascending phase) toward the upper position, possibly reaching the limit of travel of the seat column 20.

When the vertical acceleration once again increases to reach a value such that the resulting force being exerted on the seat column 20 and the passenger P once again becomes greater than the pushing force of the balancing device 15, the seat column 20 and the passenger P held by the latter will tend to return to the lower position (descending phase).

In that respect, it is preferable to equip the balancing device 15 with a damping system, which especially makes it possible to reduce any oscillation phenomenon and avoid an abrupt arrival in abutment during the ascending or descending phase. It can independently be an internal or external damping system. It will be understood that this damping is effective for each movement cycle of the seat column 20.

As already mentioned above, the vertical travel of the seat column 20 can be implemented independently of the use of an articulated linkage 30 between the fixed column 10 and the seat column 20. As an alternative example, the vertical travel of the balancing device 15 could likewise be implemented in the context of a restraint system in which the seat column would be guided with respect to the fixed column by means of sliders or runners.

As can be seen in FIG. 1, the hydraulic cylinder 15 is preferably coupled to an accumulator 125, which accumulator 125 is capable of generating a hydraulic pressure necessary to the balancing of the weight of the seat column 20. This accumulator 125 can especially be a hydropneumatic accumulator, in particular a hydropneumatic accumulator of bladder type, which is filled with a gas (for example nitrogen) which acts as compressible fluid and makes it possible to accumulate energy. In this instance, this accumulated energy is exploited to generate the hydraulic pressure necessary to the balancing of the weight of the seat column 20, namely, to compensate for the force exerted on the hydraulic cylinder 15 by the weight of the seat column 20. As illustrated in FIG. 1, the accumulator 125 is advantageously borne by the support element 100 previously mentioned. The assembly composed of the hydraulic cylinder 15, the accumulator 125 and the support element 100 accordingly forms a particularly compact arrangement and one that is easy to integrate into the system.

In the example illustrated in which the balancing device 15 is of hydraulic (or hydropneumatic) type, it is particularly advantageously to provide means allowing an adjustment of the internal pressure of the hydraulic (or hydropneumatic) device. This makes it possible to vary the sensitivity of the balancing device 15 (and therefore of the whole system) to the vertical acceleration exerted throughout the roller coaster ride. The intensity of the effect will consequently be able to vary depending on the selected internal pressure.

Moreover, the balancing device 15 can be equipped with a system making it possible to adjust and control the speed of the vertical travel of the seat column 20. In the example illustrated, this can be done by the addition of a hydraulic fluid flow rate regulator so as to adjust the speed of the piston 15a both during its opening (in ascending phase) and during its closure (in descending phase). This flow rate regulator can be internal to the hydraulic cylinder 15, or external, namely, placed in the hydraulic circuit associated with the cylinder 15.

It will generally be understood that various modifications and/or improvements that are obvious to a person skilled in the art can be made to the embodiments described in the present description without going beyond the scope of the invention as defined by the appended claims. In particular, the articulated linkage and the vertical travel are two distinct functions which can be implemented separately of one another, or, very advantageously, in combination.

Moreover, although the figures show an embodiment in which a dedicated accumulator is associated with the restraint system, other solutions can be envisaged. For example, in one variant, a centralized accumulator, of greater capacity, could be coupled to several restraint systems, in particular to each restraint system of one and the same row of passengers or of one and the same vehicle. In such a case, it will therefore be understood that the accumulator will no longer necessarily be disposed on and incorporated in each restraint system, but will be disposed in the vicinity of the row of passengers concerned or on the vehicle concerned, and that all of the hydraulic systems of the various restraint systems will then be coupled to one and the same centralized accumulator.

Moreover, although FIGS. 1 and 2 show a restraint system to maintain a passenger in an essentially seated posture in which the fixed column is disposed on the floor of a vehicle, it will be understood that the same principle is applicable assuming a reversed installation in which the passenger restraint system is suspended, with feet dangling, under a vehicle like the installation described in European patent application No. EP 0 545 860 A1. The invention is likewise also applicable to a flying installation in which passenger restraint systems are designed to support and hold the passengers in an essentially lying posture like the installation described in European patent application No. EP 1 201 280 A2.

Furthermore, and independently of the above, the fixed column can without preference be composed of an element fixed to the support platform or to the chassis of the vehicle bearing the passenger restraint system, or form an integral part of this support platform or of this chassis.

LIST OF THE REFERENCE SYMBOLS USED IN THE PRESENT DESCRIPTION AND IN THE DRAWINGS

1 passenger restraint system according to an embodiment of the invention

10 fixed column

15 balancing device, in particular hydraulic or hydropneumatic device (e.g. hydraulic or hydropneumatic cylinder)

15a piston of the hydraulic or hydropneumatic cylinder 15

15A lower end of the balancing device 15, articulated on the fixed column 10

15B upper end of the balancing device 15 (upper end of the piston 15a), articulated on the seat column 20

20 seat column, that can be displaced vertically with respect to the fixed column 10

20A seat support

30 articulated linkage between the fixed column 10 and the seat column 20/parallelogram linkage

31 pair of lower levers of the articulated linkage 30

32 pair of upper levers of the articulated linkage 30

100 support element mounted at the bottom end 15A of the balancing device 15 and mounted inside a recess formed within the fixed column 10

125 accumulator for the balancing of the weight of the seat column 20 (in particular, hydropneumatic accumulator)

200 holding device for the passenger P secured to the seat column 20

201 backrest with lateral holding elements

201A headrest incorporated in the backrest 201

202 seat with lateral holding elements

203 front safety bar mounted pivotably on the seat column 20

204 holding element mounted at the distal end of the front safety bar 203

P passenger in an essentially seated posture h height (variable) of the seat column 20

$h_1$ height of the seat column 20 in the lower position $h_2$ height of the seat column 20 in the upper position A amplitude of the travel of the seat column 20

The invention claimed is:

1. A passenger restraint system for roller coasters designed to maintain a passenger in an essentially seated or lying posture, with suspended feet, wherein the passenger restraint system comprises a fixed column and a seat column designed to support and hold the passenger, which seat column is coupled to the fixed column so as to be displaceable with respect to the fixed column during a roller coaster ride, wherein the passenger restraint system further comprises a balancing device ensuring a balancing of the seat column, which balancing device is fixed, at a first end, to the fixed column and, at a second end, to the seat column, and wherein the passenger restraint system further comprises a holding device secured to the seat column, the holding device comprising a backrest fixed to the seat column, against which the passenger can bear, with a back placed against the backrest.

2. The passenger restraint system according to claim 1, wherein the seat column is coupled to the fixed column by means of an articulated linkage, and wherein the first and second ends of the balancing device fixed respectively to the fixed column and to the seat column are articulated.

3. The passenger restraint system according to claim 2, wherein the articulated linkage comprises a set of levers articulated on the fixed column and on the seat column and forming a parallelogram linkage between the fixed column and the seat column.

4. The passenger restraint system according to claim 2, wherein the balancing device extends through an interstitial space of the articulated linkage.

5. The passenger restraint system according to claim 1, wherein the balancing device is configured to ensure a vertical travel of the seat column during the roller coaster ride in dependence of a vertical acceleration exerted on the passenger.

6. The passenger restraint system according to claim 5, wherein the balancing device is equipped with a system making it possible to adjust and control a speed of the vertical travel of the seat column.

7. The passenger restraint system according to claim 1, wherein the balancing device is a spring device.

8. The passenger restraint system according to claim 7, wherein the spring device is a gas spring.

9. The passenger restraint system according to claim 1, wherein the balancing device is a hydraulic or hydropneumatic device.

10. The passenger restraint system according to claim 9, wherein the hydraulic or hydropneumatic device is a hydraulic or hydropneumatic cylinder.

11. The passenger restraint system according to claim 6, wherein the balancing device is a hydraulic or hydropneumatic device, and wherein the balancing device is equipped with a hydraulic fluid flow rate regulator making it possible to adjust and control the speed of the vertical travel of the seat column.

12. The passenger restraint system according to claim 9, wherein the passenger restraint system further comprises an accumulator coupled to the balancing device and capable of generating a hydraulic pressure necessary to the balancing of a weight of the seat column.

13. The passenger restraint system according to claim 12, wherein the accumulator is a hydropneumatic accumulator.

14. The passenger restraint system according to claim 9, wherein an internal pressure of the hydraulic or hydropneumatic device is adjustable.

15. The passenger restraint system according to claim 1, wherein the passenger restraint system is configured such that the seat column occupies, in the presence of the passenger and in the absence of any vertical acceleration other than that due to gravity, a lower position with respect to the fixed column.

16. The passenger restraint system according to claim 15, wherein the passenger restraint system is configured such that an assembly formed of the seat column and the passenger can rise from the lower position when said assembly is subjected to a vertical acceleration such that a resulting force exerted on the seat column and the passenger becomes lower than a pushing force exerted by the balancing device.

17. The passenger restraint system according to claim 16, wherein the passenger restraint system is configured such that the seat column and the passenger can successively undergo an ascending phase during which the seat column and the passenger rise from the lower position, followed by a descending phase during which the seat column and the passenger are returned to the lower position.

18. The passenger restraint system according to claim 1, wherein the balancing device is equipped with a damping system.

19. The passenger restraint system according to claim 1, wherein the holding device further comprises:

a seat borne by a support of the seat column; and a front safety bar mounted pivotably on an upper part of the seat column and designed to be lowered onto and around a torso of the passenger.

20. The passenger restraint system according to claim 19, wherein the backrest and the seat each comprise a pair of lateral holding elements configured to enclose the passenger at the back, arms, hips and thighs.

21. The passenger restraint system according to claim 19, wherein the front safety bar comprises a holding element configured to come to bear against an abdomen and an upper part of thighs of the passenger when the front safety bar is lowered.

22. A roller coaster comprising at least one passenger restraint system according to claim 1.

23. A passenger restraint system for roller coasters designed to maintain a passenger in an essentially seated or lying posture, wherein the passenger restraint system comprises a fixed column and a seat column designed to support and hold the passenger, which seat column is coupled to the fixed column so as to be displacable with respect to the fixed column during a roller coaster ride, wherein the passenger restraint system further comprises a balancing device ensuring a balancing of the seat column, which balancing device is fixed, at a first end, to the fixed column and, at a second end, to the seat column, wherein the balancing device is configured to ensure a vertical travel of the seat column during the roller coaster ride in dependence of a vertical acceleration exerted on the passenger, wherein the passenger restraint system is configured such that the seat column occupies, in the presence of the passenger and in the absence of any vertical acceleration other than that due to gravity, a lower position with respect to the fixed column, and wherein the passenger restraint system further comprises a holding device secured to the seat column, the holding device comprising a backrest fixed to the seat column, against which the passenger can bear, with a back placed against the backrest.

24. The passenger restraint system according to claim 23, wherein the passenger restraint system is configured such that an assembly formed of the seat column and the passenger can rise from the lower position when said assembly is subjected to a vertical acceleration such that a resulting force exerted on the seat column and the passenger becomes lower than a pushing force exerted by the balancing device.

25. The passenger restraint system according to claim 24, wherein the passenger restraint system is configured such that the seat column and the passenger can successively undergo an ascending phase during which the seat column and the passenger rise from the lower position, followed by a descending phase during which the seat column and the passenger are returned to the lower position.

26. The passenger restraint system according to claim 23, wherein the balancing device is equipped with a damping system.

27. The passenger restraint system according to claim 23, wherein the holding device further comprises:

a seat borne by a support of the seat column; and a front safety bar mounted pivotably on an upper part of the seat column and designed to be lowered onto and around a torso of the passenger.

28. The passenger restraint system according to claim 27, wherein the backrest and the seat each comprise a pair of lateral holding elements configured to enclose the passenger at the back, arms, hips and thighs.

29. The passenger restraint system according to claim 27, wherein the front safety bar comprises a holding element configured to come to bear against an abdomen and an upper part of thighs of the passenger when the front safety bar is lowered.

30. A roller coaster comprising at least one passenger restraint system according to claim 23.

\* \* \* \* \*